United States Patent Office 3,207,843
Patented Sept. 21, 1965

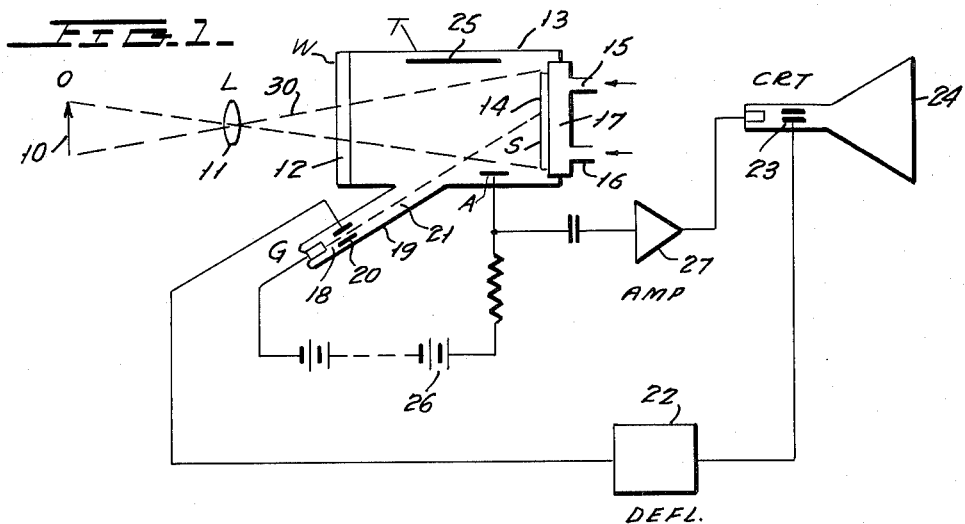
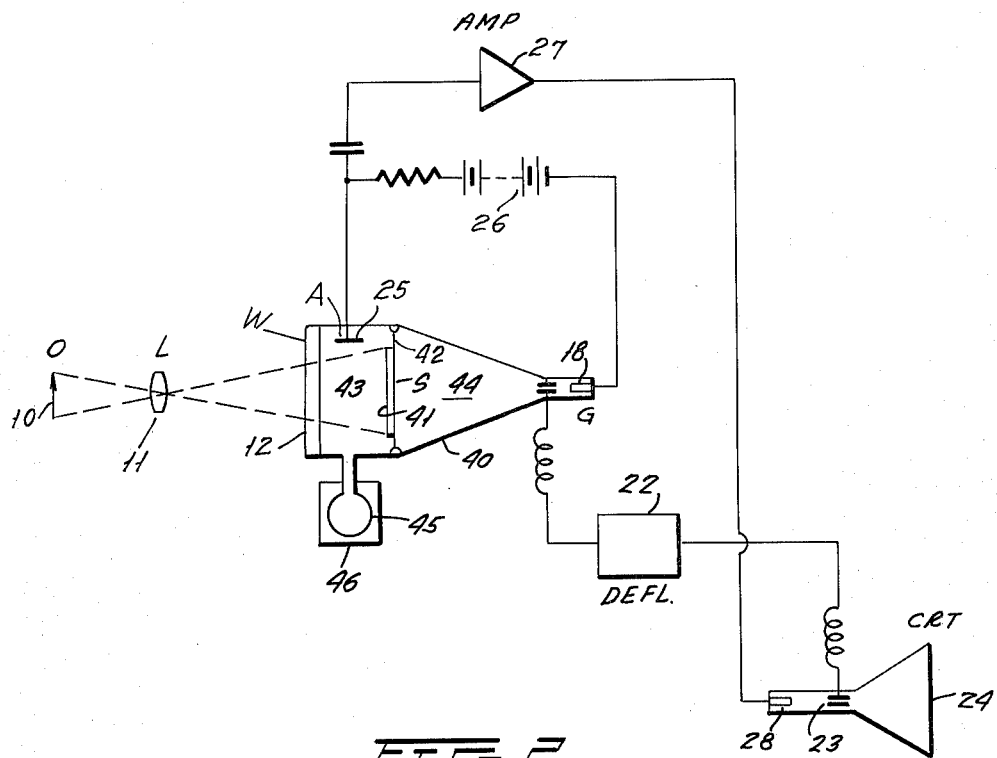

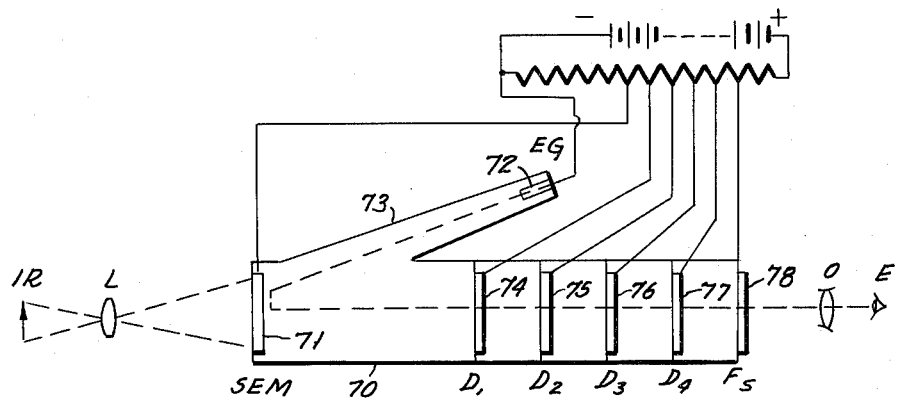
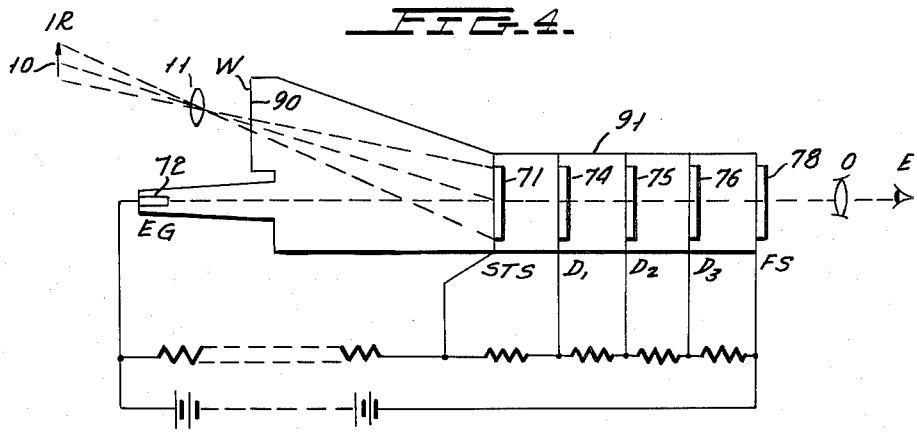

3,207,843
INFRARED IMAGING DEVICE USING
DEPOSITABLE MATERIALS
Adolph H. Rosenthal, deceased, late of Forest Hills, N.Y., by Lilly S. Rosenthal, executrix, Forest Hills, N.Y., assignor to Kollsman Instrument Corporation, Elmhurst, N.Y., a corporation of New York
Filed Nov. 16, 1962, Ser. No. 238,300
2 Claims. (Cl. 178—6.8)

His invention —relates to a novel infrared imaging device and more specifically relates to a novel imaging structure wherein infrared radiation alters the secondary to primary electron emission ratio of a medium whereby scanning the medium with a cathode ray beam produces signals which are modulated in accordance with the image content.

Many mediums are known which have a secondary to primary electron image ratio which is sensitive to infrared radiation. Typical of these are ionic crystal screens which consist of a layer of ionic crystals such as an alkali halide which is deposited on a suitable substrate of metal by evaporation techniques.

The secondary electron emission characteristics of such screens are well known and, for example, for the case of a potassium chloride screen, such measurements have been published by M. Knoll, Zeitschrift für Physik, volume 122, page 137 (1944).

The measurements made above show that the secondary to primary emission ratio has the usual shape which rises quickly with electron velocity to between 1,000 and 2,000 volts, and then slowly drops off. The absolute values of the ratio are relatively high and at room temperature is at about 8 at 2,000 volts and decreases slowly to 6 at 8,000 volts. Moreover, the ratio is found to be sensitive to temperature so that the measurement falls to about 5 at 300° C. It is to be noted that this temperature dependence of the secondary emission ratio is contrary to that of metals where the ratio is generally independent of temperature.

The secondary emission ratio of ionic crystal layers are further affected by the formation of F-Centers where the formation of such F-Centers tends to decrease the secondary emission ratio considerably.

The present invention utilizes the change in the secondary to primary emission ratio due to temperature and due to the formation of such F-Centers across the surface of an ionic crystal when the radiation of an infrared source is imaged on a screen formed of the ionic crystal. Thus, the crystal screen can be scanned by an electron beam with the secondary electrons being accelerated to an anode adjacent to the screen to develop a signal voltage which is related in time to the scan of the electron beam. This signal voltage can then be applied to a normal cathode ray tube which scans in synchronism with the electron beam scanning the ionic crystal, whereby a visual representation of the infrared source is available in the cathode ray tube.

As a further embodiment of the invention, and rather than using independent cathode ray tube, the secondary electrons can be directed by means of appropriate dynodes to a florescent screen in the same structure housing the crystal, whereby the infrared image can be directly viewed in a single device.

A still further embodiment of the invention contemplates the use of the selective formation of a contamination on portions of an electron emissive surface exposed to infrared so that only those portions of the surface will emit sufficient electrons to cause formation of an image on a remote image producing means. By way of example, and as in the monoscope signal tube, a gas is contained within a housing, whereby the focusing of the infrared image on the rear electron emissive surface of the housing causes the local temperature thereof to increase. This causes the deposit of a thin layer of the contaminant gas and thereby decreases the secondary emission ability of the areas so coated. Conversely, the contaminant can be of a high secondary emission material and be deposited on a low secondary emission material screen so that only the image portions will generate substantial numbers of electrons.

Accordingly, the primary object of this invention is to provide a novel structure for presenting the image of an infrared source.

A further object of this invention is to provide a novel means for presenting the image of an infrared source which utilizes the change in secondary to primary electron emission ratio of a screen which receives the infrared image.

These and other objects of the invention will become apparent from the following description when taken in connection with the drawings, in which:

FIGURE 1 shows a schematic diagram of a first embodiment of the invention in which the secondary electrons emitted by an ionic crystal screen are collected in an anode with the anode signal being delivered to a cathode ray tube which is scanned in synchronism with the scanning of the ionic crystal screen.

FIGURE 2 shows a second embodiment of the invention in which the secondary emission characteristics of the screen is altered by evaporating a controlled impurity on the screen in accordance with the image of an infrared source.

FIGURE 3 shows a still further embodiment of the invention where the display surface and infrared sensitive screen are in a common envelope.

FIGURE 4 shows a modification of the embodiment of FIGURE 3.

Referring first to FIGURE 1, he has schematically shown an infrared image system which is formed in accordance with the invention. In FIGURE 1, the arrow 10 schematically illustrates an infrared object. This object is imaged by a lens system 11 and through a window 12 of an evacuation housing 13, upon the surface of image screen 14, which is on the rear wall of housing 13. The imaging screen 14 can, for example, be an ionic crystal layer of potassium chloride. The rear of housing 13 is then provided with an inlet opening 15, and outlet opening 16, which lead into and out of chamber 17, which is in thermal contact with ionic crystal 14. A source of a constant temperature liquid (not shown) is then connected to inlet 15 so that the constant temperature liquid circulates through chamber 17 to maintain the crystal 14 at a constant temperature. An electron gun 18 is then connected in an extending neck 19 of evacuated housing 13 and is provided with an appropriate scanning or deflection system 20 which will scan the electron beam indicated by the dotted line 21 across the ionic crystal layer 14 in any desired mode.

By way of example, the electron beam may scan in a cartesian coordinate television type pattern, or a polar coordinate PP1 type pattern. The scanning circuit of electron gun 18 includes deflection means 22 which is also connected to the deflection means 23 of a usual cathode ray tube 24, whereby, as will be seen more fully hereinafter, a visual representation of the infrared source will be available on the face of the cathode ray tube 24.

It is to be noted in FIGURE 1 that the electron gun structure is purposely offset with respect to the screen 14 to simplify the cooling of the screen. Moreover, the mounting of the screen on a metallic base which is in intimate contact with chamber 17 assists the cooling of the screen.

The container 13 additionally has anode ring 25 therein which is placed adjacent to screen 14 and is held at a positive potential with respect to electron gun 18 by an appropriate source of D.-C. voltage 26. The anode 25 is then capacitively coupled to an amplifier 27 which is then connected to the control elements 28 of the cathode ray tube 24, whereby the beam intensity of cathode ray tube 24 at any instant is dependent upon the number of secondary electrons emitted from screen 14 which are gathered by anode 25.

The embodiment of FIGURE 1 is useful particularly where the basis of operation is a change in primary to secondary emission ratio due to changes in color center or F-Center density in the ionic screen 14. In operation, a uniform deposit of F-Centers is produced on screen 14 by periodically flooding the screen with electrons from the electron gun 18 or by irradiating screen 14 with ultraviolet or X-rays. Preferably, however, the flooding is performed by temporarily defocusing the cathode ray beam or a regular scan by the focused beam. The infrared radiation from object 10 is shown in dotted lines 31 as being focused by lens system 11 on screen 14. This infrared radiation produces local change or local erasing in F-Center density on the screen in accordance with the radiation density from the image. This erasing action is not fully understood, although it is presently used in many types of skiatron tube applications and, as is believed, depending upon the spectral range of the radiation, the F-Centers, which consist of electrons trapped at anion vacancies are transformed into other centers such as $F^1$ Centers which probably consist of two elecrons trapped at defect locations. Far infrared radiation acts directly by its temperature effect in detaching the loosely bound F-Center electrons from their trapped positions and letting them recombine with V-Centers (anions with one electron removed).

Regardless of the phenomenon which causes the observed results, the established effect of infrared radiation is a local lowering of the F-Center densities and thereby causing a local increase in the secondary emission ratio at that local point. Thus, the infrared image impresses itself upon screen 14 as an image of varying secondary to primary emission ratio. By scanning this image by an unmodulated electron beam from electron gun 18, the number of secondary electrons emitted at any time will depend upon the character of the infrared radiation in the object which corresponds to the instantaneous location of the scanning beam. This secondary electron emission will be picked up in anode 25 so that the input to amplifier 27 will be a varying input which is synchronized with the scanning sequence of the electron gun 18. After amplification in amplifier 27 and any other desired processing, this signal is impressed on the cathode ray tube 24 which scans in synchronism with gun 18 whereby the intensity of the visual image on cathode ray tube 24 reproduces the secondary to primary emission ratio distribution across screen 14 and thus the infrared object 10.

If desired, the amplifier 27 can contain contrast or gamma modification or inversion means by which the average edge contrasts of the image including their sign may be considerably modified. Many modifications of the arrangement of FIGURE 1 will now be apparent. By way of example, and where temperature effects are primarily relied upon to control the secondary emission ratio (as where the far infrared spectral region is of greater importance), the ionic crystal layer 14 would preferably be mounted on a substrate low thermal capacity such as a thin skin of metal aluminum oxide or plastic. With this type of arrangement, the constant temperature control for the screen is not needed. Moreover, the F-Center density should preferably be held to as low a value which will still be adequate for the production of noticeable changes in the secondary emission ratio, since high F-Center density (as required for adequate visual absorption changes in dark trace tube applications) result in a burning-in of the image and a slowness of erasure. Moreover, high F-Center densities can possibly cause changes in the screen properties such as the formation of colloidal deposits which take considerable time to erase.

FIGURE 2 shows a second embodiment of the invention wherein the primary secondary electron emission ratio of a screen is varied by the deposition of a contaminant.

In FIGURE 2, components similar to those of FIGURE 1 have been given similar identifying numerals. FIGURE 2 differs essentially from FIGURE 1 in the image-forming tube 40. Thus, in FIGURE 2 the screen 41, which corresponds to screen 14 in FIGURE 1, is carried on a substrate of low thermal capacity such as the thin membrane 42 which is of metal, although it could be formed, for example, of aluminum oxide. The membrane 42 separates container 40 into two compartments 43 and 44, wherein compartment 44 includes the electron gun structure 18. The compartment 43 is the evaporation or condensing chamber and is connected to a vessel 45 which is placed in a suitable temperature bath 46, so as to maintain a predetermined vapor pressure in the evaporation chamber 43. The container is filled with a paraffin or oil material and operates somewhat similar to the evaporagraph method of Czerny.

In operation, the velocity of the primary electrons from gun 18 is adjusted in such a way that the major portion of secondary electron emission occurs toward the evaporation chamber 43. Techniques for achieving this end are well known in the image intensifier art using secondary emission amplification.

When the substrate 42 is of metal or oxide, it will normally have a rather high secondary emission ratio. Thus, the evaporable material is chosen as a suitable paraffin oil or silicone which has a relatively low secondary emission ratio. The deposition of the evaporable material over the screen area will depend upon the equilibrium temperature of the material which is, in turn, dependent upon the local radiation density of the infrared image. To insure maximum absorption of a particular infrared spectral region of interest, the substrate 42 can contain materials of high absorptivity such as carbon-black.

In operation, and after the deposition of the low secondary emission ratio material on the screen 42 in accordance with the infrared image on the screen, the screen will be scanned by an electron beam from gun 18. Clearly, the secondary emission electrons will be gathered by anode 25 to form an appropriate input signal for the cathode ray tube 24.

Alternative to the arrangement of FIGURE 2, the subtrate 42 could be formed of a material of low secondary emission ratio such as carbon-black coated on a metal oxide screen with the evaporable material being of high primary to secondary electron emission ratio such as potassium chloride or cesium chloride or other suitable salt, or a low subliming metal such as mercury or an alkali metal.

It will be noted that in FIGURES 1 and 2, the secondary electrons originating at the screen surface are used to produce a signal modulation in the anode circuit which controls the display cathode ray tube, or some equivalent recording means. It is, however, possible that the secondary electron emission can enter an electron multiplier incorporated within the tube which delivers the signals to some outside circuit as is the practice in image orthicons which are used as television pick-up tubes.

In the embodiments of FIGURES 1 and 2, it was necessary to use two separate cathode ray tubes, one for forming the infrared image as a variation in a secondary primary electron emission ratio and another to produce the visual image. FIGURE 3 shows an embodiment of the invention wherein an image is directly produced on the viewing screen of a tube which incorporates therein a primary to secondary emission ratio sensitive screen. Thus, in FIGURE 3, a single tube 70 has a screen 71 which could be similar to the screen 14 of FIGURE 1 whose secondary to primary electron emission ratio varies in accordance with the variation in infrared intensity in the object 10. An electron gun 72 is schematically illustrated in FIGURE 3 and is contained in neck 73 of tube 70 and projects an electron beam toward screen 71.

The electron beam from tube 72 can be controlled in one of two ways, depending upon the choice of the designer. A first mode of operation includes the controlled defocusing of the beam so that the full area of screen 71 constantly receives primary electrons. A second mode of operation is the scanning of screen 71 by a narrow beam of electrons which scans the screen in television fashion.

The body of tube 70 then has a plurality of dynodes 74 through 77 which function to electron-optically focus the secondary electrons from screen 71 upon fluorescent screen 78, which presents a visual image of the infrared object 10. Thus, in operation, the infrared object 10 is imaged onto screen 71 to set up corresponding local variations in the secondary to primary electron emission ratio.

A source of primary electrons is formed by the electron beam from gun 72 which generate secondary electrons in screen 71 which are deposited in accordance with the infrared object 10. These secondary electrons are then focused upon screen 78 by dynodes 74 through 77 which are constructed in accordance with well known techniques.

Alternative to this action, and by appropriate control of the relative voltages on the various electrodes, and the velocity of the primary electrons, the varying secondary electron emissivity of screen 71 can result in a variation of the potential disposition over screen 71. This causes a varying reflection of the primary electrons whereby the primary electrons are then reflected toward screen 78.

It is to be noted that the system can be designed to utilize both of these effects; that is, both the reflection of primary electrons and emission of secondary electrons can be simultaneously effective in delivering energy to screen 78. Moreover, and instead of using dynodes 74 through 77 which serve as multiplier stations which could also be of the second image type, as used in image intensifiers, the electrons, whether primary or secondary from screen 71 can be electron-optically focused on screen 78. Moreover, various types of combinations of transmitting structures such as optical-florescent-photoelectric coupling or any other combination could be used to transmit energy from screen 71 to screen 78.

FIGURE 4 shows a modification of FIGURE 3, wherein the infrared sensitive screen 71 does not serve as a mirror and the electron gun 72 is repositioned.

In FIGURE 4, the infrared radiation is focused through window 90 in housing 91 and toward infrared sensitive screen 71. The screen 71 is scanned by electron gun 72 either by scanning or by a flooding beam of primary electrons. The plurality of dynodes 74, 75 and 76 then focus energy on the fluorescent screen 78 to permit visual observation of the infrared object 10.

Although he has described preferred embodiments of his novel invention, many variations and modifications will now be obvious to those skilled in the art, and he prefers therefore to be limited not by the specific disclosure herein but only by the appended claims.

What is claimed is:

1. An infrared imaging device comprising a screen of material characterized in locally varying its ratio of primary to secondary electron emission responsive to local reception of infrared radiation, means for focusing an infrared image on said screen, electron gun means for scanning said screen with a beam of primary electrons, and anode means adjacent said screen for receiving secondary electrons emitted by said screen; said anode means being connected to input circuit means for determining the local distribution of said ratio of primary to secondary electrons across said screen; said input circuit means being connected to visual display means; said screen being formed of a high secondary emission material in an atmosphere of low secondary emission material depositable on said screen in accordance with local reception of infrared radiation by said screen.

2. An infrared imaging device comprising a screen of material characterized in locally varying its ratio of primary to secondary electron emission responsive to local reception of infrared radiation, means for focusing an infrared image on said screen, electron gun means for scanning said screen with a beam of primary electrons, and anode means adjacent said screen for receiving secondary electrons emitted by said screen; said anode means being connected to input circuit means for determining the local distribution of said ratio of primary to secondary electrons across said screen; said input circuit means being connected to visual display means; said screen being formed of a low secondary emission material in an atmosphere of high secondary emission material depositable on said screen in accordance with local reception of infrared radiation by said screen.

References Cited by the Examiner

UNITED STATES PATENTS

| 2,788,452 | 4/57 | Sternglass | 315—11 |
| 2,863,087 | 12/58 | Barbier | 315—11 |
| 3,014,148 | 12/61 | King | 315—11 |
| 3,072,819 | 1/63 | Sternglass | 315—11 |

DAVID G. REDINBAUGH, *Primary Examiner.*